US007890987B2

(12) United States Patent
Freimann

(10) Patent No.: US 7,890,987 B2
(45) Date of Patent: Feb. 15, 2011

(54) METHOD AND APPARATUS FOR IMPROVED ACQUISITION AND MONITORING OF EVENT INFORMATION TABLE SECTIONS

(75) Inventor: Felix Freimann, Sunnyvale, CA (US)

(73) Assignee: Opentv, Inc., San Francisco, CA (US)

( * ) Notice: Subject to any disclaimer, the term of this patent is extended or adjusted under 35 U.S.C. 154(b) by 2708 days.

(21) Appl. No.: 10/165,287

(22) Filed: Jun. 7, 2002

(65) Prior Publication Data
US 2003/0007095 A1 Jan. 9, 2003

Related U.S. Application Data

(60) Provisional application No. 60/297,988, filed on Jun. 13, 2001.

(51) Int. Cl.
*H04N 7/173* (2006.01)
(52) U.S. Cl. ....................... 725/100; 725/131
(58) Field of Classification Search ................. 725/136, 725/139, 131, 140, 54, 152, 116, 39, 135, 725/34, 137, 50, 100; 348/563
See application file for complete search history.

(56) References Cited

U.S. PATENT DOCUMENTS

| 3,623,006 | A | * | 11/1971 | Balakian et al. ............. 711/111 |
| 5,343,239 | A | | 8/1994 | Lappington et al. ........... 348/12 |
| 5,410,344 | A | | 4/1995 | Graves et al. .................. 348/1 |
| 5,452,449 | A | * | 9/1995 | Baldwin et al. ............. 707/102 |
| 5,589,892 | A | | 12/1996 | Knee et al. ..................... 348/31 |
| 5,729,718 | A | | 3/1998 | Au |
| 5,734,413 | A | | 3/1998 | Lappington et al. ........... 348/12 |
| 5,819,034 | A | | 10/1998 | Joseph et al. ........... 395/200.31 |
| 5,828,419 | A | | 10/1998 | Bruette et al. ................ 348/563 |
| 5,915,090 | A | | 6/1999 | Joseph et al. .......... 395/200.32 |
| 6,002,394 | A | | 12/1999 | Schein et al. ............... 345/327 |

(Continued)

FOREIGN PATENT DOCUMENTS

EP 1148669 5/2001

(Continued)

OTHER PUBLICATIONS

"Digital Video Broadcasting (DVB); Specification for Service Information (SI) in DVB Systems"; European Telecommunication Standard 300 468, published in a second edition in Jan. 1997, having previously been published in draft in Oct. 1994; pp. 1-72.

*Primary Examiner*—Brian T Pendleton
*Assistant Examiner*—Olugbenga Idowu
(74) *Attorney, Agent, or Firm*—Rory D. Rankin; Meyertons, Hood, Kivlin, Kowert & Goetzel, P.C.

(57) ABSTRACT

A method for acquiring and storing schedule event information from a cyclical broadcast in an interactive television system comprising a Head end (20), transmission media (32) and a client device such as a set top box (28) and display TV (26). An request queue for particular Event Information Table (EIT) schedule sections (42) is created and serviced in optimal fashion by selecting a section from the EIT request queue with the least acquisition latency based on the current position in the EIT broadcast cycle, the set top box (28) processing speed and the sequence of EIT sections (42) requested.

37 Claims, 7 Drawing Sheets

U.S. PATENT DOCUMENTS

| | | | |
|---|---|---|---|
| 6,005,562 A | 12/1999 | Shiga et al. | 345/327 |
| 6,005,631 A | 12/1999 | Anderson et al. | 348/360 |
| 6,025,837 A | 2/2000 | Matthews, III et al. | 345/327 |
| 6,031,577 A | 2/2000 | Ozkan et al. | 348/465 |
| 6,040,850 A | 3/2000 | Un et al. | |
| 6,040,867 A | 3/2000 | Bando et al. | |
| 6,209,131 B1 | 3/2001 | Kim et al. | 725/50 |
| 6,216,264 B1 | 4/2001 | Maze et al. | 725/53 |
| 6,473,129 B1 | 10/2002 | Choi | |
| 6,477,180 B1 * | 11/2002 | Aggarwal et al. | 370/468 |
| 6,895,595 B2 * | 5/2005 | Goodman et al. | 725/136 |
| 6,959,327 B1 * | 10/2005 | Vogl et al. | 709/219 |
| 7,069,572 B2 * | 6/2006 | Stalker | 725/34 |
| 2001/0052856 A1 * | 12/2001 | Deniau et al. | 340/825.22 |
| 2002/0116711 A1 * | 8/2002 | Courtney et al. | 725/50 |
| 2007/0133610 A1 * | 6/2007 | Shikatani | 370/487 |

FOREIGN PATENT DOCUMENTS

| | | |
|---|---|---|
| EP | 1 182 881 | 2/2002 |
| EP | 1 225 768 | 7/2002 |
| WO | WO 00/31973 | 6/2000 |
| WO | WO 00/39947 | 7/2000 |

* cited by examiner

METHOD AND APPARATUS FOR IMPROVED ACQUISITION AND MONITORING OF EVENT INFORMATION TABLE SECTIONS

CROSS REFERENCE TO RELATED APPLICATIONS

The following application claims priority from U.S. Provisional Patent Application No. 60/297,988, entitled: "A Method and Apparatus for Improved Acquisition and Monitoring of Event Information Table Sections", by Felix Freimann, which was filed on Jun. 13, 2001, which is hereby incorporated herein by reference in its entirety. This application claims priority from and is also related to U.S. patent application Ser. No. 09/189,733 titled: "System and Method for Information Filtering" by Felix Freimann, which was filed on Nov. 10, 1998, which is hereby incorporated herein by reference in its entirety.

COPYRIGHT NOTICE

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever Copyright 2002 Open TV, Inc.

BACKGROUND OF THE INVENTION

1. Field of the Invention

The present invention relates generally to interactive television systems, and more particularly, to the rapid acquisition, processing, storing and monitoring of schedule event information tables.

2. Summary of the Related Art

Interactive television systems are capable of displaying text and graphic images in addition to typical video program streams and provide a number of services and interactive applications to viewers. Generally, a broadcast service provider generates an interactive television signal for transmission to a viewer's television. The interactive television signal includes an interactive portion consisting of application code or system information, as well as an audio-video portion consisting of a television program. The broadcast service provide combines the audio-video and interactive portions into a single signal for transmission to a receiver connected to the viewer's television. The signal is generally compressed prior to transmission and transmitted through typical broadcast channels, such as cable television (CATV) lines or direct satellite transmission systems.

A set top box connected to the television controls the interactive functionality of the television. The set top box receives the signal transmitted by the broadcast service provider, separates the interactive portion from the audio-video portion, and decompresses the respective portions of the signal. The set top box uses the interactive information to execute an application while the audio-video information (after processing) is transmitted to the television, for example. The set top box may combine the audio-video information with interactive graphics or audio generated by the interactive application prior to transmitting the information to the television. The interactive graphics and audio may present additional information to the viewer or may prompt the viewer for input. The set top box may provide viewer input or other information to the broadcast service provider via a modem connection The video, audio, and system information may be sent from a head end in various blocks of data via various transport mediums. For example, they may be sent from the head end via cable or satellite to the set top box. An example of the contents of such system information includes information regarding present or future events, services which the user of the set top box may access, and the current time and date. Examples of events include a television program (e.g., news, movie, sports), while an example of services includes a set of channels broadcast by the network (head end). Information on events is contained within an Event Information Table (EIT). This information is typically transferred from the head end to the set top box in EIT sections. These EIT sections are continuously re-broadcast by the head end due to the fact that the head end does not know when a set-top box is powered on.

Information on events scheduled to appear on various services may be requested by the viewer. However, due to bandwidth limitations the re-broadcast typically starts only every 20-30 seconds presenting an inherent delay in receipt of the EIT information. Hence, the time it takes for this information to be gathered, processed, and displayed on a television set may be significant due to the cycle time of the data delivered to the set top box. There is therefore, a need for a system and method for rapid acquisition time for receipt of EIT schedule event information, so that a viewer can quickly access the schedule information.

A head end might broadcast EIT-Schedule tables, which carry scheduling information for multiple days. A set top box may choose to either cache the schedule data (e.g. in memory) or to extract it from the broadcast stream in real time as the need arises. However, due to the fact that the size of the whole broadcast schedule data base may exceed available memory in the set top box, the set top box may choose to cache only part of the schedule database and acquire the remainder from the broadcast stream in real time as required.

A broadcast contains EIT schedule data as well as video, audio, network description and other data. The EIT schedule data is continuously repeated. The repeat time is called the cycle time. The EIT schedule broadcasts schedules for services in sequence, that is, service A, followed by service B, followed by service C, etc. A set top box will instruct a hardware filter to acquire schedule data for specific services. To prevent data overflow due to scheduling information arriving at a high bit rate and to reduce processing time, known systems set up hardware filters to acquire schedule data for a single service, for example service A. The hardware filter typically does not acquire any scheduling information for service B or C, etc.

Assuming that the set top box wants to acquire EIT scheduling information for service A, B and C, a typical EIT schedule engine would set up the hardware filter to acquit c the schedule data (section) for service A, then set up for the EIT section for service B and at last set up and acquire the EIT section for service C. The broadcast is repeated periodically, for example, every 30 seconds. Due to the fact that the hardware acquisition filter setup is in the same sequence as the broadcast schedule data, theoretically the schedule information could be acquired in a single cycle, if the acquisition and processing is fast enough to acquire a selected EIT schedule and set up the filter for the next service schedule prior to the next service schedule appearing on the broadcast.

Typical set top box processors, however, are not fast enough to acquire a selected service schedule, process it and set up the hardware filter before the next service schedule information section is presented in the broadcast stream. Moreover, if the EIT service schedule information sections are requested in reverse order, from which it is broadcast for example, requesting EIT sections for service C, service B, and then service A, the acquisition processor would have to set up the filter for service C, process the service C EIT section, wait another cycle until service B EIT section is rebroadcast, capture service B EIT and wait another cycle until service A EIT section is rebroadcast to capture the service A EIT. Thus, there is a need for an improved method and apparatus for rapidly acquiring EIT schedule information regardless or processor speed or the EIT event information broadcast sequence The above is a brief description of some deficiencies in the prior art and advantages of the present invention. Other features, advantages, and embodiments of the invention will be apparent to those skilled in the art from the following description, drawings, and claims.

SUMMARY OF THE INVENTION

The present invention provides a system and method for rapidly acquiring schedule event information in an interactive television system. The schedule event information for each event may include, for example, the event start time and date, its duration and additional event descriptions. The present invention reduces the latency time required for acquisition of EIT which is continuously rebroadcast in a carousel every 20-30 seconds. The present invention provides for faster EIT schedule data acquisition without regard to the sequence of broadcasted schedule information or set top box process or speed. Moreover, a head end may change its broadcast schedule data sequence and the present invention enables a set top box to adjust to the new sequence, whether or not the head end broadcasts an EIT broadcast sequence.

A method of the present invention generally includes monitoring the broadcast EIT to determine realtime current location in the rebroadcast cycle for EIT sections. The schedule event information is acquired and stored for events having a start time and date within a selected window. A system of the present invention generally includes a processor for monitoring EIT schedule event information, learning the EIT broadcast sequence and predicting which EIT section will next appear in the broadcast. In another aspect of the invention, a computer program product generally includes computer code that stores the schedule event information for events having a requested sequence number within the EIT. The method and apparatus of the present invention further comprises a computer programmed with instructions that determine the position of the EIT within the repetitive cycle or carousel, the section number position within the EIT and requests the next desired EIT section having the shortest latency within the EIT rebroadcast cycle.

BRIEF DESCRIPTION OF THE DRAWINGS

Corresponding reference characters indicate corresponding parts throughout the several views of the drawings.

DETAILED DESCRIPTION OF THE INVENTION

Figure 1:
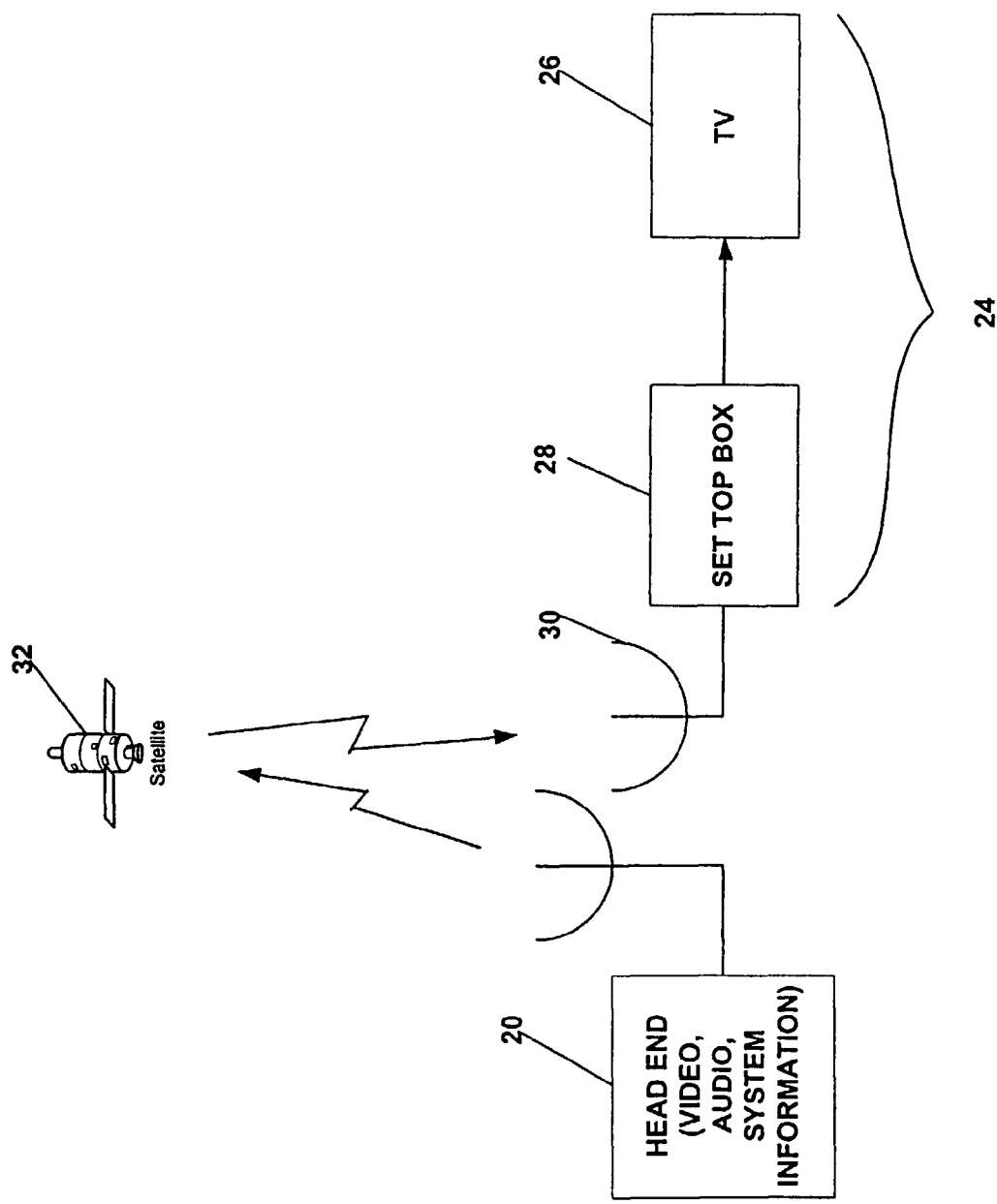
FIG. 1 is a diagram illustrating the distribution of interactive television applications, television programs, and system information from a source to a receiving station.

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

In a preferred embodiment a head end broadcasts an EIT broadcast schedule database. Hence, the head end knows the sequence in which schedule information (sections) is transmitted. Thus, the head end informs the set top box of the transmission sequence. This can be accomplished in different ways. The head end can set the schedule information sequence in one or more descriptors, which are part of a Network Information Table (NIT), Bouquet Association Table (BAT) or Standard Definition Television (SDT). The Digital Video Broadcast (DVB) standard does not specify such a descriptor. A descriptor only holds 256 bytes of data and hence might be quite limited. The head end preferably sends the EIT section schedule information sequence in a private table, which the set top box would also receive and interpret. The advantage of this solution is that a private table is built of multiple sections, each of which can comprise up to 4 Kbytes and hence can hold more data than a single descriptor. The head end injects a private table into the broadcast to contain the EIT schedule information. In an alternative embodiment, the present invention monitors the EIT section broadcast and determines the sequence or schedule in which the head end broadcasts EIT sections.

Once the set top box receives the sequence of broadcast schedule information and stores it internally as a sequence table, an EIT Schedule engine sets up a first hardware filter to acquire EIT schedule data. Preferably, a hardware filter is assigned to continuously monitoring the EIT broadcast. Thus, the open hardware filter enables the EIT Schedule engine to determine the sequence number of the section currently being broadcast and thus the current position of the EIT broadcast. The open hardware filter can also monitor and determine the amount of time between EIT sections to determine the availability processing and filter setup time prior to attempting a section acquisition. Thus, the EIT schedule engine sets up the hardware filter to capture the next available requested EIT section. The EIT schedule engine uses the stored EIT to determine an optimal section to request next. In addition, the set top box determines based on its installed hardware how fast it can set up, acquire and process acquired schedule information. The EIT schedule engine can introduce an interleave into the stored sequence table to accommodate optimal acquisition or EIT sections. The EIT schedule engine also monitors and stores the broadcast section sequence and section version numbers instead of receiving the broadcast sequence from the head end.

Turning now to FIG. 1, FIG. 1 is a diagram illustrating the distribution of interactive television applications, television programs (audio and video) and system information (e.g., number of services, service names, event names, event schedules) from a source to a viewer. The system includes a head end 20, which may be coupled with a video and audio device (not shown) that feeds a particular video with associated audio to the head end. The audio-video-interactive signal contains television programs or similar audio-video content, as well as interactive content such as control signals, system information, and interactive applications. The video information may be digitized at the head end 20 and transmitted via a transmitter to a receiving system 24. The information transmitted by the head end 20 may be transmitted to the receiving system 24 in various ways. For example, the transmitted information may be sent to the receiving system 24 via a broadcast signal such as a satellite transmission. The receiving station 24 may also be configured to receive signals via a modem channel or cable. The receiving system 24 may include, for example, a television 26 connected to a set top box 28. The set top box 28 may include a receiving antenna 30 for receiving information from a satellite 32. The receiving station antenna 30 passes the interactive television signal to the set top box 28, which performs the processing functions of the receiving station 24. Once information is received through the receiving antenna 30, it may be processed by the set top box 28 and displayed on the television set 26. In this manner, audio, video, and interactive data may be received and processed by the set top box 28. The signals transmitted via the broadcast or modem channels may embody various modules which comprise components of an interactive application. The modules may contain any type of data, such as application code, raw data, or graphical information.

System information provided to the set top box 28 includes a list of services (e.g, CNN, MTV, ESPN) available to a viewer, event names (e.g., Dateline, Star Trek), and a schedule of the events (start time/date and duration). This information is provided in an EIT Schedule. The EIT Schedule data is provided by the head end 20 and transmitted to the set top box 28 or determined by monitoring the EIT section sequence. The set top box 28 includes an EIT-Schedule module which acquires, processes, and stores EIT-Schedule information for a specified period of time so that a viewer can quickly access and display a selected portion of the EIT-Schedule. Before a viewer can request EIT-Schedule event information, preferably, the viewer inputs an EIT-Schedule window 40 into which schedule events fall (FIG. 2).

Figure 2:
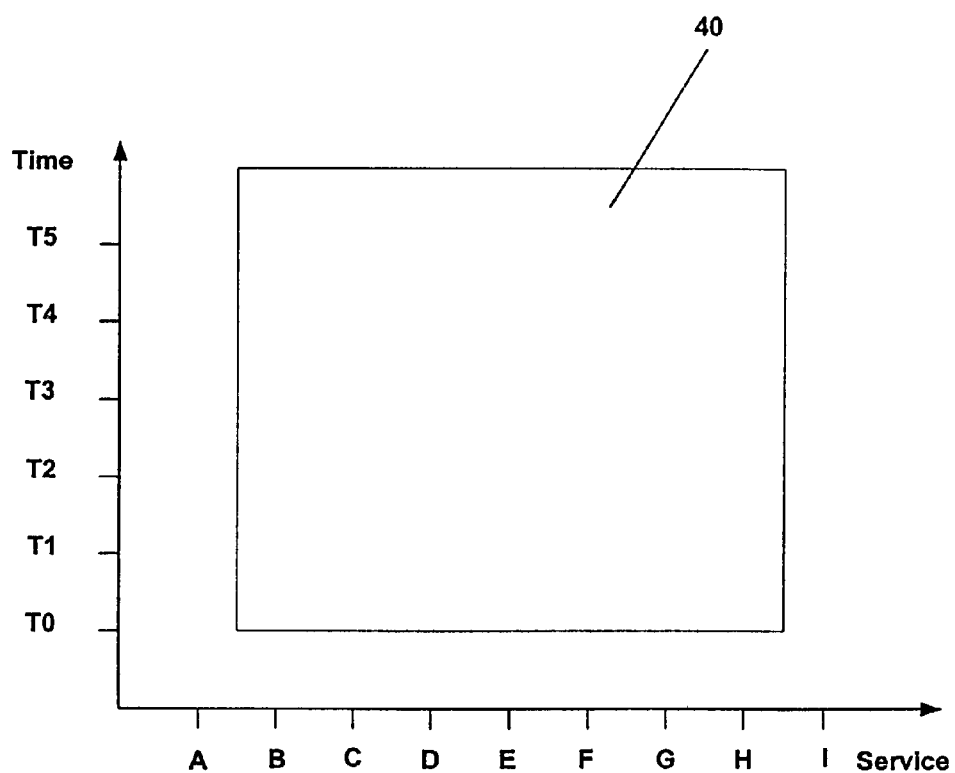
FIG. 2 is an illustration of an EIT scheduling window.

The EIT-Schedule window 40 is defined for selected services over a specified period of time (FIG. 2). As shown in FIG. 2, a horizontal axis of the graph includes a list of services (A-I) and a vertical axis lists times and dates (T0-T5). EIT requests for EIT-Schedule events which belong to a service that is part of the EIT-Schedule window 40 and fall within the time range of the window will be acquired, processed and stored in the set top box 28. For example, a scheduled event will be accepted as being within the EIT-Schedule window 40 if all of the following apply: the event belongs to a service which is part of the list of services for the window; the event's start time/date and duration fall within the window's start time/date and duration; and the event passes successfully to a content discriminator (described below) used to further filter the data. The duration of an event can be used to determine the end time/date of the event, or an event end time/date may be provided in place of the duration. In the following description, either the end/time date or duration may be used and both are interchangeable with one another.

Figure 3:
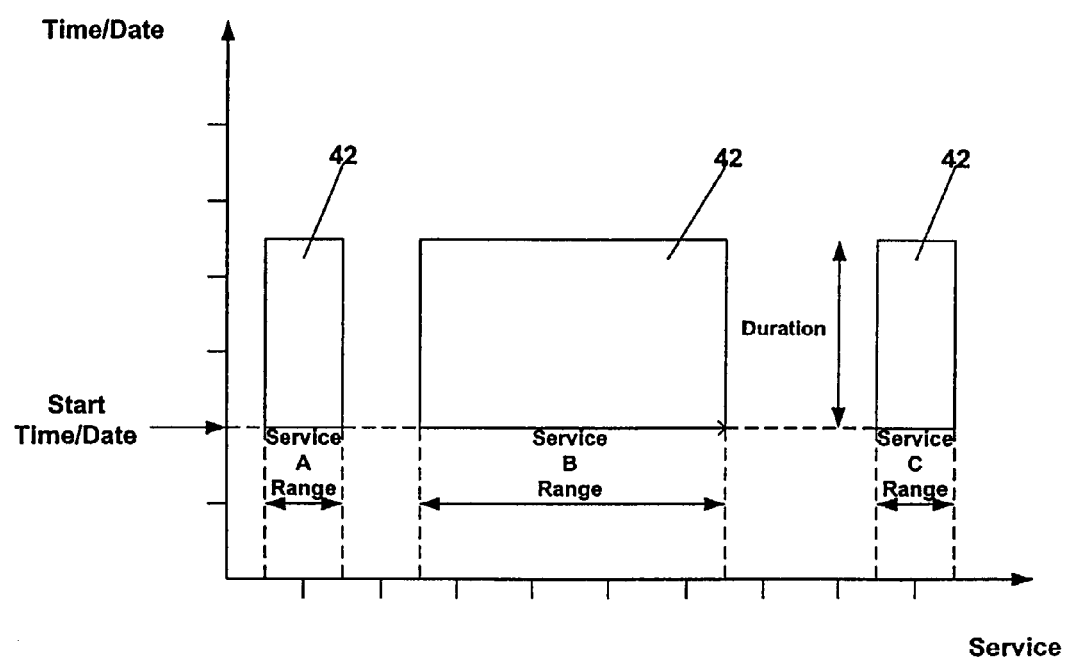
FIG. 3 is a schematic illustrating an EIT-Schedule comprising a plurality of EIT sections.

A viewer may define multiple EIT-Schedule windows for which a schedule module will acquire and store the EIT-Schedule event sections. The window may also be created by an application running in the set top box 28. As shown in FIG. 3, the monitored list of services does not need to be consecutive (i.e., in the order the services are located in the event information table). However, the monitor window start time/date and duration applies to all services assigned to an EIT-Schedule window. The three blocks 42 shown in FIG. 3 make up one EIT-Schedule window. The EIT-Schedule module may also be used to modify an EIT-Schedule window after it has been defined by a viewer, by adding or removing services or modifying the start time/date and duration. A viewer may also delete an entire EIT-Schedule window.

After the EIT-Schedule module has created an EIT-Schedule request it will return a handle to the user which uniquely identifies the window within the EIT-Schedule module. An application or user will not be able to extract EIT-Schedule information until a handle has been created for the window. In addition to creating a handle for the window, a handle will be created for each event within the EIT-Schedule window. If the user releases a handle to a schedule event, the event will not be discarded as long as it still falls within at least one EIT-Schedule window. Once the application or user has created a handle to an EIT-Schedule event, it will receive a notification if the EIT-Schedule event changes. For example, the user may receive a notification if an EIT-Schedule event is no longer available (e.g., falls outside the given window, or is no longer part of the playout) or if a new version of the EIT-Schedule event is received.

The EIT-Schedule module is preferably configured to create two different types of EIT-Schedule windows; a storage EIT-Schedule window and a monitor EIT-Schedule window. The storage EIT-Schedule window may be, for example, a representation of the EPG (Electronic Program Guide) window displayed on a television screen (i.e., time/date and duration settings and list of services). The EIT-Schedule module acquires the EIT-Schedule events which fall within a storage EIT-Schedule window and store them in a system heap, as described below. An application or user can create handles to these events and use these handles to extract event information (e.g., descriptors, start time/date). If an application terminates, all handles to schedule events will be destroyed. The EIT-Schedule module will remove the associated window object and schedule event objects if they do not fall within the requested EIT-Schedule.

When an application or user first creates an EIT-Schedule request, the EIT-Schedule module will check through its already acquired list of EIT-Schedule event sections to see if they fall within the request. The module will also determine if additional sections or sections are required to obtain every possible schedule event which may fall within the request. The present invention matches the requested events in a window to their corresponding EIT section numbers which are determined by monitoring the EIT broadcast or are transmitted from the head end. This information is stored in the client device receiving the EIT broadcast. If required, the EIT-Schedule module will instruct a section manager to acquire specific sections or sections. When new EIT-Schedule event sections which fall into a storage EIT-Schedule window are received, the EIT-Schedule module notifies the owner of the window of this new condition. For example, the owner may be notified when the following conditions occur: EIT-Schedule events are received and are ready for further processing, however, not all events have been received; the last EIT-Schedule event section which falls within the window has been received; or the EIT-Schedule module ran out of memory and cannot store all EIT-Schedule events.

Figure 4:
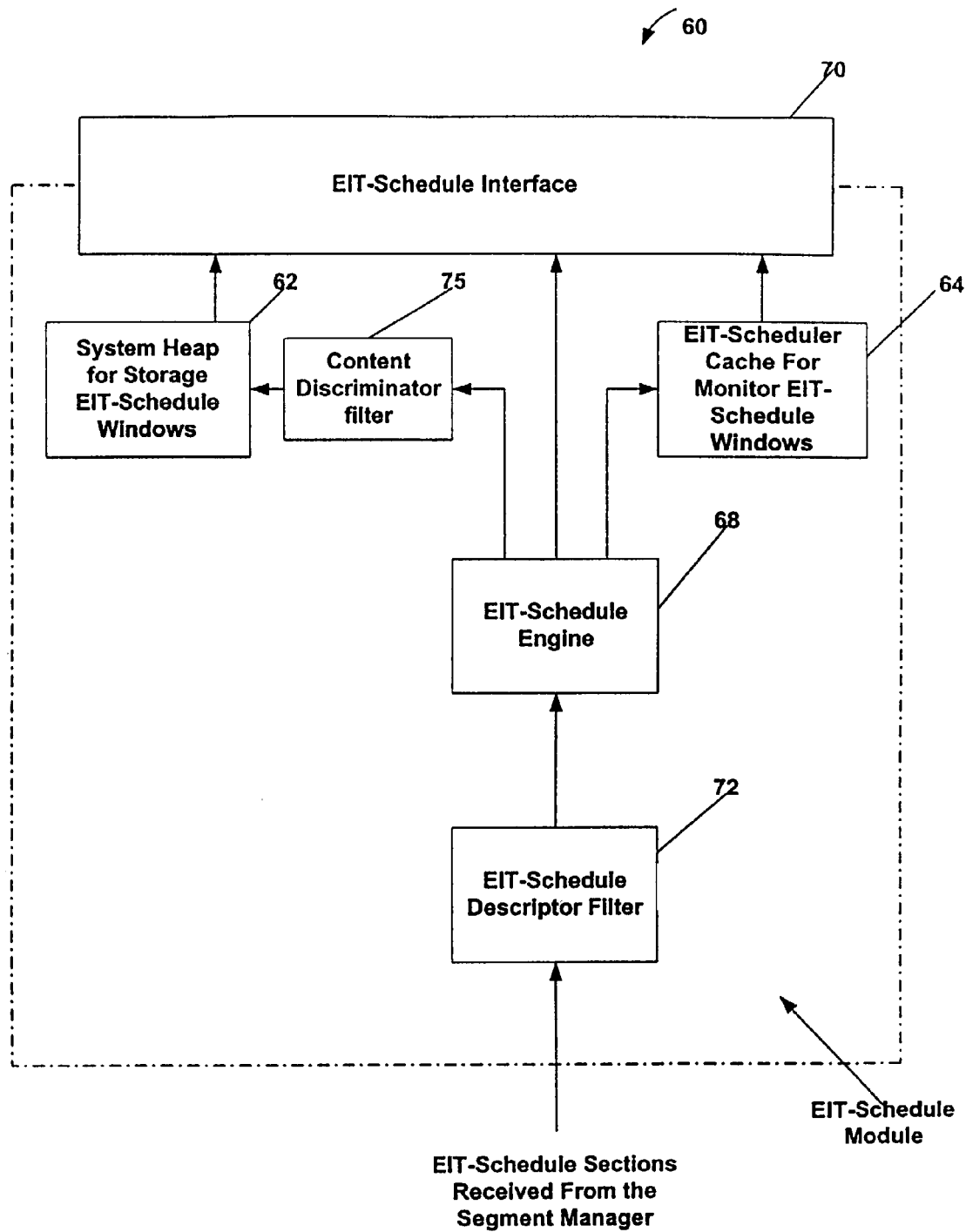
FIG. 4 is a block diagram illustrating an EIT-Schedule module of the present invention.

FIG. 4 is a block diagram illustrating the EIT-Schedule module 60. The EIT-Schedule module 60 acquires, processes, and stores EIT-Schedule events. The module includes an EIT-Schedule database which stores the EIT-Schedule events and its associated control structures and an EIT-Schedule engine 68. The database is comprised of system heap memory 62 for storage EIT-Schedule windows and EIT-Schedule cache 64 for monitor EIT-Schedule windows. During initialization, the EIT-Schedule engine 68 receives a section of memory (EIT-Schedule cache), which it uses to store EIT-Schedule event sections which fall within a monitor EIT-Schedule window. All control structures and information of EIT-Schedule events, which do not fall within a monitor EIT-Schedule window but do fall within a storage EIT-Schedule window, are stored in the system heap, assuming the heap has enough memory available to store the data. The EIT-Schedule module 60 further includes an EIT-Schedule interface 70 for communication with an application and an EIT-Schedule descriptor filter 72, and a content discriminator filter 75 described below.

The EIT-Schedule window defines a list of services and start time/date duration for which the EIT-Schedule events will be continuously monitored and stored (in the EIT-Schedule cache 64 for monitor windows or system heap 62 for storage windows) and managed by the EIT-Schedule engine 68. The list of services is monitored by the EIT-Schedule engine 68. Therefore, the EIT-Schedule cache 64 will not be cleared when the application terminates. However, EIT-Schedule event information, which does not reside in the EIT-Schedule cache will be cleared when an application terminates. If an application requires more application memory than it has available, the EIT-Schedule cache 64 can be given to the application. The information contained within the EIT-Schedule cache 64 is destroyed in the process and the EIT-Schedule engine 68 will stop monitoring for EIT-Schedule event sections, which fall within a monitor EIT-Schedule window. However, the setup information of the EIT-Schedule windows will not be destroyed. Once the application terminates, the EIT-Schedule cache 64 is given back to the EIT-Schedule engine 68, which again starts to monitor EIT-Schedule events which fall inside a monitor EIT-Schedule window.

If the EIT-Schedule engine 68 tries to use more storage than is available in the system heap 62, the EIT-Schedule engine will preferably discard the EIT-Schedule event information and send a message to the current application. If the EIT-Schedule engine 68 tries to use more storage than is available in the EIT-Schedule cache 64, the EIT-Schedule engine discards the EIT-Schedule event information and stores this condition in a status flag An application may query this status flag.

When an application requests EIT-Schedule event information, the EIT-Schedule engine 68 checks first in the EIT-Schedule database to see if the information is available and current. If the information is available, current and stable (e.g., all version numbers are current and not in the process of being updated), the application has immediate access to the EIT data. If the requested information is not available, however, the EIT-Schedule engine 68 instructs a section manager to acquire the data from the EIT broadcast. Once the information is stored in the EIT-Schedule database (EIT-Schedule cache or system heap) the requesting application is notified. The application can then access the stored EIT-Schedule event information.

An application may also stop and restart the EIT-Schedule engine 68. If the EIT-Schedule engine 68 is stopped, all information stored in the EIT-Schedule database is removed. However, the EIT-Schedule engine preferably remembers the last setting of the EIT-Schedule window and uses a start command to reacquire the EIT-Schedule event information with these last settings. An application may make EIT-Schedule event requests for any known service. If the requested EIT-Schedule event information is current and already part of an EIT-Schedule window and is already stored in the EIT-Schedule database, the application has instant access to the information. However, if the requested EIT-Schedule event information is not already stored in the EIT-Schedule database and no similar request is pending, the EIT-Schedule engine 68 acquires the information from the broadcast and stores it in system heap memory 62. The application will be notified once the EIT-Schedule event information is stable. If the application terminates or releases the handle pointing to the requested EIT-Schedule event and this event is not part of any other EIT-Schedule window, all event information will be removed from the EIT-Schedule database. However, if the resource pointed to an EIT-Schedule event which is part of another EIT-Schedule window then the event information will not be removed.

A request for an EIT-Schedule section or section from the EIT-Schedule engine 68 is sent to an EIT-Schedule section manager which collects data from the broadcast. The EIT-Schedule section manager is in charge of retrieving DVB sections from the broadcast. The EIT Schedule section manager issues commands to a programmable hardware filter to collect specific EIT sections from the broadcast. Once the programmable hardware filter has received an entire EIT section it will notify the section manager. A notify routine is used to send a message to the section manager indicating that the section is ready to be processed. The section manager receives the message and pre-processes (e.g., version check, section already received) the attached section. Due to the fact that EIT-Schedule sections may be received with a high bit rate, it is possible that the sections are received faster than the section manager can process the messages sent via the notify routine. Therefore, in order to control the acquisition rate of the EIT-Schedule sections, the section manager preferably requests a limited number of EIT-Schedule sections to wait for further processing in the section manager's message queue. If this limit is reached the section manager does not allow any further notifications of EIT-Schedule sections. However, if an EIT-Schedule section is rejected based on the limit, the hardware filter will continue to acquire EIT-Schedule sections.

Once all requested EIT-Schedule sections are received, the section manager continues to monitor EIT-Schedule sections for version changes. In order to reduce processing time, the hardware filters are preferably switched off after all requested sections have been received and enabled periodically or continuously if desired to monitor the EIT-Schedule sections for version changes and arrival times. For example, after a time delay (e.g., five minutes) the section manager may enable the hardware filters and monitor the EIT-Schedule section headers. If no version change is detected in the EIT section headers, the filters are again disabled for a period of time. The time delay value may be specified during initialization of the set top box 28. The filter may also continuously monitor the EIT broadcast.

Figure 5:
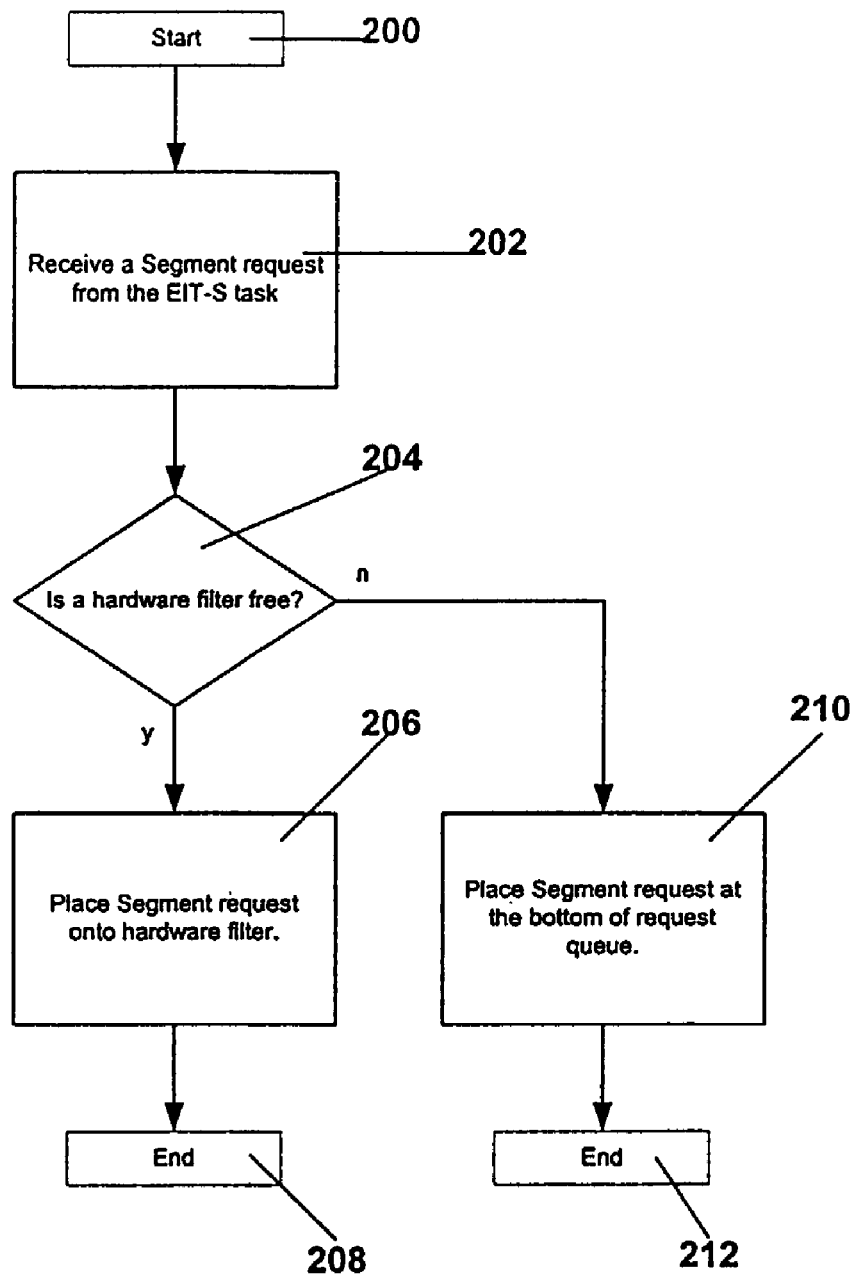
FIG. 5 is an illustration of a flow diagram for receiving a section request.

Turning now to FIG. 5, FIG. 5 is a flow diagram for adding an EIT section request to a section request queue. The EIT section manager task adds an EIT section request 200 to the section request queue for processing 202 as shown in FIG. 5. As shown in FIG. 5, a thread within the EIT schedule engine (EIT-S task) receives a request for a specific EIT schedule section, which is entered in block 200. As shown in block 202, the preferred embodiment of the present invention receives a section request for a particular EIT schedule section from an EIT-S task. For purposes of the present example, multiple tasks are shown running concurrently, however, alternative embodiments are enabled where a single task is running.

In block 204 the EIT section request task checks to see if there is a free hardware filter available for capturing an EIT section. A plurality of hardware filters are configurable within the EIT schedule engine. The number of hardware filters available depends upon the number of filters provided in the set top box and the number of filters already assigned to other tasks by the EIT schedule engine.

If a hardware filter is available 204, the EIT section request task places a section request on an available hardware filter 206. This processing ends at block 208. If a hardware filter is not available 204, the EIT section request task places the request on the bottom of a hardware filter request queue 210. This processing ends at block 212. A single hardware filter request queue is preferably provided for the plurality of hardware filters. Whenever a filter becomes free, the EIT section request task checks the filter request queue for section requests. If a filter request is pending in the hardware filter request queue, the hardware filter removes the pending request from the queue and processes it.

In one embodiment of the present invention, hardware filters may be preoccupied with prior EIT section requests. Whenever a section request is placed on a filter, the filter cannot process another request until the filter finishes processing the current section request. In another alternative embodiment, the filter can accept and process multiple requests. There are two ways in which a filter may become free. Either the filter receives the entire section and becomes free or the filter times out because it does not receive the entire section within an allotted time.

Figure 6:
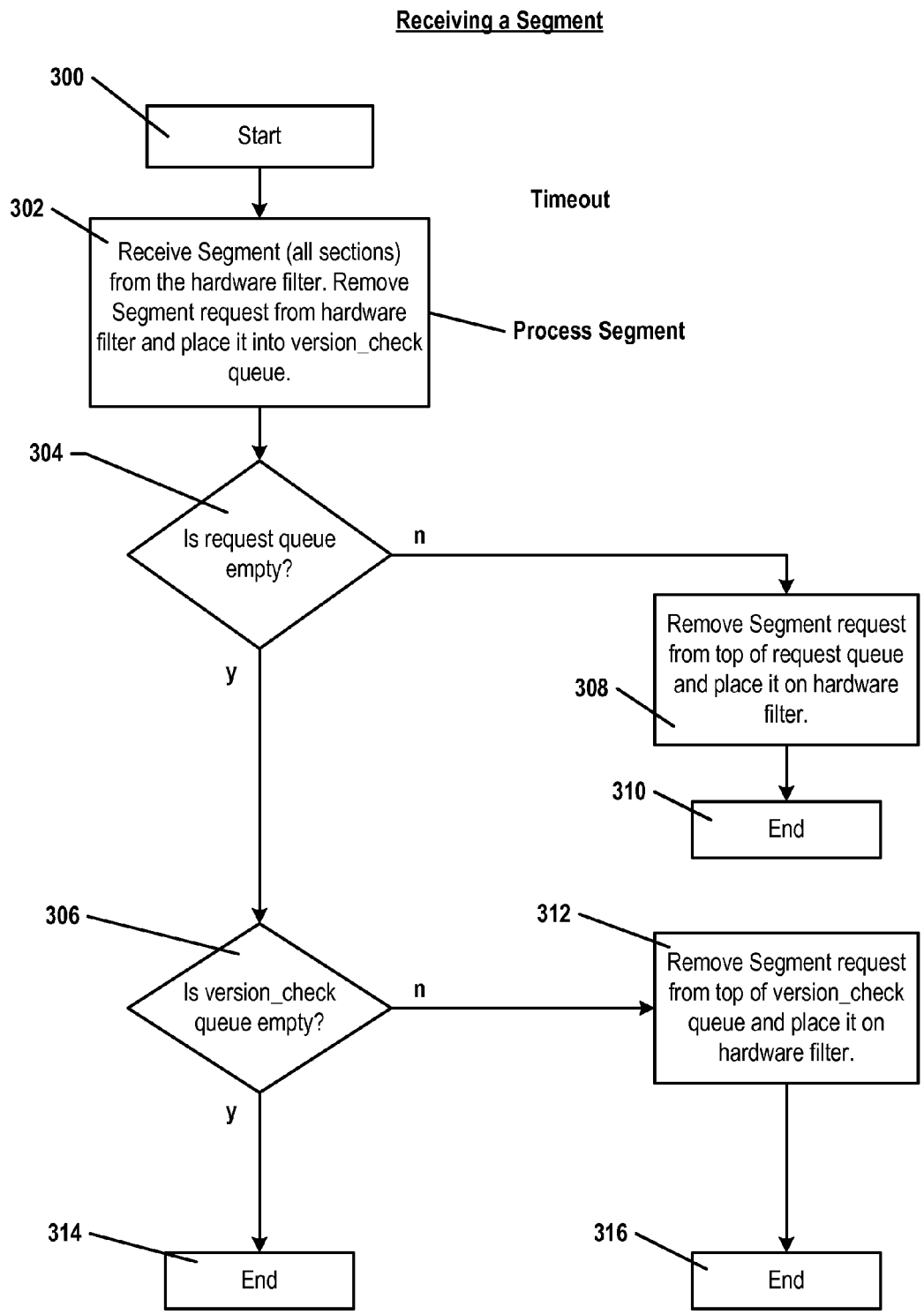
FIG. 6 is an illustration of a flow diagram for adding a section request.

Turning now to FIG. 6, an embodiment of the receiving section thread is shown. Starting at block 300, the receiving section thread receives the EIT section from the hardware filter 302, removes the section request from the hardware filter and places it into the version check queue. The task then checks to see if the section request queue is empty 304. If the section request queue is empty, the task checks to see if the version queue is empty 306. If the version queue is empty, this processing ends at block 314. For simplicity only two queues are shown. Once the EIT-S task receives all requested EIT sections or sections, the EIT-S task then determines whether the version number has changed. Each EIT section contains a version number field containing a version number. The EIT section version number can be continually monitored. If the version number changes, the task EIT-S task reacquires a new version of all older version EIT sections 312 and this processing ends at block 316.

The first time the EIT-S task acquires a section or section, it simply acquires the section or section without regard to prior version numbers. Once a section is acquired, however, the task determines the then current version number of the particular EIT section and stores the version number in an internal database. If the request queue is not empty 304, the task removes an EIT section request from the top of the request queue and places it on a hardware filter 308. The process ends at block 310.

The next time the same section number request and version is placed on the queue, the monitoring hardware filter checks to see if the section request has the same version number as the current version number as determined by comparing the monitored current version number to the acquired version number in the monitoring filter version number table. If the section number has already been acquired and has the current version number, it is not reacquired. The monitoring hardware filter periodically or continuously monitors and stores the version number for each EIT section in a current version number table. If the requested EIT section number has an older version number than the current version number for the requested section, the hardware filter acquires the requested EIT section from the broadcast again to obtain the latest version of the requested section. If the requested section has the current version number, it is not reacquired. In this case the hardware filter becomes free and takes the next section request off of the section request queue. There are a plurality of hardware filter retry queues provided for multiple retries for section acquisition before removing the section request from the section request queue.

Figure 7:
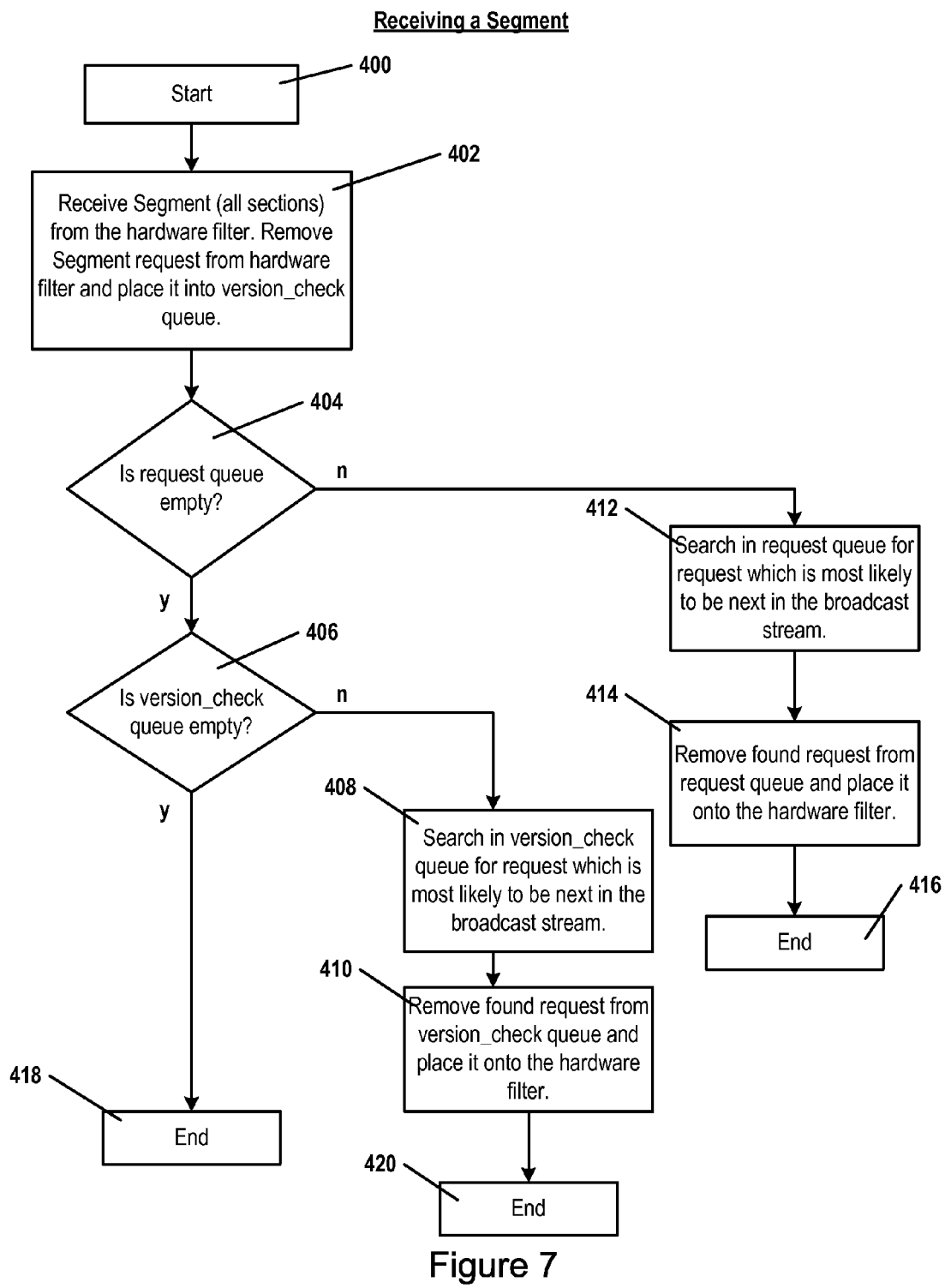
FIG. 7 is a diagram adding a section request.

Turning now to FIG. 7, as shown in FIG. 7, another embodiment of the present invention, a receive section thread is illustrated. The processing starts at block 400. Once the section is received it is processed. The requested and received EIT section is removed from the hardware filter and placed onto the version check queue. The filter becomes free once the received section is removed from it. The EIT receive section task then checks to see if the request queue is empty 404. If the section request queue is empty, the task checks to see if the version queue is empty 406. If the version queue is empty, this processing ends at block 418. If the version check queue is not empty, the version check queue is searched for a request which is most likely to be next in the broadcast stream 408, the found request is removed from the queue and placed onto the hardware filter, and processing ends at block 420. If the request is not empty, as shown in block 412, the present invention searches in the request queue for a request that is most likely to be next available and attainable in the broadcast stream. The task then removes the found request from the request queue and places it onto the hardware filter 414. The processing ends at block 416.

This decision as to which EIT section is most likely to be next in the broadcast stream is based on the last EIT section received, the EIT section sequences the section currently being monitored by the open hardware filter, and next section expected to follow and be available and attainable in the broadcast stream after the receive section thread is finished processing the current section request. If a first candidate section request has already started in the broadcast, the section is not attainable in its entirety and another candidate section request is selected from the section request queue for acquisition rather than waiting 20-30 seconds until the requested section reappears in the broadcast cycle.

As discussed above, EIT sections are broadcast in a repeating carousel in serialized form, one section after the other. The sections are repeatedly transmitted in a cyclical fashion every 20-30 seconds. The section presentation sequence, however, is not standardized. Thus, the EIT section presentation sequence is either transmitted by the head end operator or the EIT section presentation sequence is monitored and stored by the set top box EIT section acquisition task.

In a preferred embodiment, the EIT section acquisition task leaves a monitor hardware filter open at the client device, that is, the EIT task assigns a filter to periodically or continuously monitor the broadcast stream so that the short header at the beginning of each EIT section is monitored to identify each section and its version number as it is presented in the broadcast stream carousel. The broadcast order of the EIT sections and the current version number for each section, as identified by the open hardware filter are stored in EIT task memory. The section broadcast order is utilized to predict which section will be available next in the broadcast stream, based on the last section received and the time it takes to set up a filter to capture the next EIT section. The EIT section header is small, on the order of 8-12 bytes. Thus, in this learning or monitoring mode, the EIT task monitors the EIT section headers in the broadcast stream to learn the section number and version, memorize and store the order and temporal spacing and position of EIT sections being transmitted in the broadcast.

The processing latency or delay after a section is received and processed is taken into account in determining whether the next available section has already begun or passed in the carousel. For example, the EIT broadcast sequence table may indicate a 1, 2, 3, broadcast sequence. That is, EIT section number 2 is next in the broadcast sequence after receiving EIT section number 1, however, if section number 2 has already started in the broadcast stream after receiving section number, it is too late to acquire section 2 from its beginning, thus, the EIT task would have to wait an entire section retransmission cycle (20-30 seconds minimum) to acquire section number 2 in its entirety. In this case, it is more efficient to select the next available section number that has been requested rather than being idle while waiting on section number 2 to come around again in the broadcast cycle. For example, if section 3 has been requested, it would be faster to request section number 3, which has not started in the broadcast stream and acquire section 3 during the current cycle, and then request section number 2 in its entirety to be acquired in the next cycle.

The monitoring, learning and storing of the EIT section transmission sequence enables universal application of the present invention in a variety of set top boxes and a variety of head end systems without the requirement of having the head end transmit a section sequence table. Thus the present invention is quicker and more versatile than presently known EIT acquisition systems.

There is also a processing latency consideration that is added in the EIT section table during initialization. In an alternative embodiment, the EIT acquisition task skips over a request for one or more sequential EIT sections to account for processing latency. For example, if sections 1, 2, 3 and 4 are requested, and the EIT broadcast sequence is 1, 2, 3, 4; in order to account for processing latency, the EIT acquisition task can build in processing delays by skipping over a requested sequential section when it appears in the broadcast stream right after a section currently being acquired or appears in the stream before the processor will be finished processing the section currently being acquired or appears in the broadcast stream before the processor will be finished processing the section currently being acquired. For example, after processing a request for section 1, the EIT acquisition task can then either request section 2 if no latency delay is desired, request section 3 if a one section processing latency delay is desired, or request section 4 if a two section processing latency is desired, etc. The processing section latency delay can be based on processor type installed in the set top box or on historical processing times data used to determine how much, if any, processing delay should be placed in selecting which section should be requested next.

In an alternative embodiment, the EIT section acquisition hardware filter is set up to acquire the requested section and the next sequential section so that if the next sequential section is requested it is already in the filter memory and ready for processing. In yet another alternative embodiment, the EIT section acquisition hardware filter is set up to acquire the requested section number and the next requested section number whether or not the next requested section number is sequential, so that the next requested section number it is already in the filter memory and ready for processing.

A system clock receipt time stamp, section byte count or section duration can also be associated with each received section and used to predict when the next requested section in the request queue will be available and used to determine whether the next available section has already passed to determine if the next requested section in the request queue can be acquired or should be skipped. If skipped, the skipped request is placed back in the request queue and the next available request that can be processed at the current time given the current position of the broadcast stream will be honored and processed. It may be that more than one EIT section request may be skipped if more than one requested EIT section will pass by before the processor is ready to process the request. Skipped requests are replaced in the EIT section request queue to be processed in the next broadcast cycle. A historical record or typical processing time for each processor at the client device is provided by the client device or down loaded by the head end to enable calculation of required time to process a received EIT section and set to receive the next EIT section. A neural net can also be utilized to learn the section transmission sequence, processing delays and inter-section delays to predict the next optimal available section based on system response time, the section sequence and the queue of requested sections.

In yet another alternative embodiment, the EIT section transmission sequence is transmitted by the head end operator and stored in memory by the section acquisition task. The head operator broadcasts the section transmission sequence in a descriptor table or some other private table. In this case, this stored EIT section transmission sequence is utilized to determine (as described above) the optimum section request selection for next best section request based on the EIT section request queue, the stored EIT section transmission sequence table and current section version numbers.

In known typical EIT acquisition systems, EIT acquisition task waits an entire carousel repeat cycle to acquire each individual section. In order to shorten the acquisition time, the present invention searches in the section request queue for an optimal section that will become available with minimum latency for acquisition in the broadcast stream. This optimal section is removed from its position in the queue and placed on the hardware filter.

In another alternative embodiment, the EIT section acquisition hardware filter is opened in a generalized monitor form. The filter looks for a particular section, which may be a section for a three-hour duration electronic program guide. Or the filter may be opened to receive whatever section is currently available on the broadcast stream. The filter discards broadcast elements other than the requested EIT sections, including non-EIT data, which are identified by their header. This alternative embodiment generates a great deal of data and requires a fast and efficient processor and memory to handle the increased data quantity and data processing requirements. In this case, the EIT sections can be acquired within at most two cycles and at least one cycle.

In another alternative embodiment of the present invention, all EIT sections are continuously acquired and selectively discarded after acquisition so that EIT data, current within one broadcast cycle is always available. Changes in section version numbers for requested sections initiates automatic acquisition and updating of older section versions in the data base.

In a preferred embodiment, acquired EIT sections are cached after being received for processing. After caching, the requested section numbers and version numbers are removed from the EIT section request queue. In an alternative embodiment, a cache is attached to the filter. In yet another embodiment, two caches are attached to the hardware filter so that a first requested EIT section can be acquired and stored in a first cache or transferred to memory and a second EIT section can be acquired and stored in a second cache as the first EIT section is processed in the first cache or memory. Due to memory constraints the hardware filter is configurable so that a user can selectively cache or cache and store portions of the EIT section data. For example, if a description for an upcoming movie is broadcast in three different languages, English, French and German, a user can selectively cache or cache and selectively store only the French version of the description to conserve memory.

In another alternative embodiment, the filter captures every EIT section and discards those sections which are not in the request queue. In this case, each EIT section is captured in cache and prior to the next EIT section arriving, a decision is made as to whether or not to keep the cached EIT section. If the section is to be kept, and sufficient memory is available, the cached section is stored in memory and processed later after all requested EIT sections have been acquired. In an alternative embodiment, two or more section numbers can be requested at the same time, captured by the hardware filter and cached in response to a single request.

The above described methods may be implemented in a computer program product having computer codes that perform the various steps of the methods. The computer codes are preferably stored in a computer readable medium, such as CD-ROM, zip disk, floppy disk, tape, flash memory, system memory, hard drive, and data signal embodied in a carrier wave, such as over a network.

The present invention has been described in interactive television in a preferred embodiment, however, the present invention may also be embodied in a distributed computer system comprising a server and a client device. In another embodiment, the present invention is implemented as a set of instructions on a computer readable medium, comprising ROM, RAM, CD ROM, Flash or any other computer readable medium, now known or unknown that when executed cause a computer to implement the method of the present invention.

Although the present invention has been described in accordance with the embodiments shown, one of ordinary skill in the art will readily recognize that there could be variations made to the embodiment without departing from the scope of the present invention. Accordingly, it is intended that all matter contained in the above description and shown in the accompanying drawings shall be interpreted as illustrative and not in a limiting sense.

What is claimed is:

1. A method for acquiring event information table (EIT) information in an interactive television system, the method comprising:
    monitoring an EIT broadcast at a client device, said EIT broadcast comprising a plurality of EIT sections, wherein at least a portion of said EIT broadcast is cyclic;
    initializing an EIT section table, wherein said initializing comprises incorporating section processing latencies of the client device in determining whether a requested section is to be acquired out of an order in which the requested section is broadcast;
        detecting a first request for a first section of said EIT sections and a second request for a second section of said EIT sections;
        requesting acquisition of the second EIT section prior to the first EIT section responsive to determining it is likely that the second EIT section will be attainable in the EIT broadcast prior to the first EIT section, wherein the first EIT section is available prior to the second EIT section;
        wherein determining it is likely the second EIT section will be attainable prior to the first EIT section is based at least in part on an amount of time required by the client device to process the first EIT section.

2. The method of claim 1, wherein said monitoring includes detecting a currently broadcast EIT section, and wherein determining it is likely that the first EIT section will be available and attainable prior to the second EIT section comprises predicting the next available EIT section in the broadcast based on an EIT broadcast sequence.

3. The method of claim 2, wherein said predicting comprises accessing a sequence table which indicates said EIT broadcast sequence.

4. The method of claim 3, wherein said method further comprises creating said sequence table by monitoring the EIT broadcast and learning said EIT broadcast sequence.

5. The method of claim 3, wherein said sequence is indicated by a private table received via broadcast.

6. The method of claim 1, further comprising:
    searching an EIT section request queue to detect first and second concurrently pending requests for first and second EIT sections, respectively;
        servicing the first request prior to the second request in response to determining it is likely that the first EIT section will be available and attainable in the EIT broadcast prior to the second EIT section, irrespective of an actual order of availability of the first EIT section and second EIT section.

7. The method of claim 6, further comprising selecting a request for servicing from said pending requests, wherein the selection is based in part on a current position in an EIT section broadcast, processing time to process an EIT section currently being received, and time required to set up a filter to receive another EIT section.

8. The method of claim 6, wherein the second EIT section is attainable prior to the first EIT section, and the first request is serviced before servicing the second request.

9. The method of claim 1, further comprising:
    monitoring EIT section version numbers in the broadcast;
    detecting changes of EIT version numbers; and
    automatically acquiring and updating an EIT section when its EIT section version number changes.

10. The method of claim 1, further comprising associating a receipt time stamp and byte count with received EIT sections to facilitate predicting when a next requested section will be available and attainable in the EIT broadcast.

11. The method of claim 10, wherein said predicting comprises determining an inter-section spacing between requested EIT sections to predict a next available requested section based on client device response time, an EIT section broadcast sequence, said inter-section spacing, and a queue of requested EIT sections.

12. The method of claim 1, further comprising:
    defining an EIT schedule window;
    determining if a broadcast EIT schedule event belongs in the EIT schedule window; and
    acquiring the EIT section for the EIT schedule event if the EIT schedule event belongs in the EIT window.

13. A non-transitory computer readable medium having non-transitory computer-executable instructions for performing a method for acquiring event information table (EIT) information in an interactive television system comprising:
    monitoring an EIT broadcast at a client device, said EIT broadcast comprising a plurality of EIT sections, wherein at least a portion of said EIT broadcast is cyclic;
    initializing an EIT section table, wherein said initializing comprises incorporating section processing latencies of the client device in determining whether a requested section is to be acquired out of an order in which the
requested section is broadcast;
detecting a first request for a first section of said EIT
sections and a second request for a second section of said
EIT sections;
requesting acquisition of the second EIT section prior to
the first EIT section responsive to determining it is likely
that the second EIT section will be attainable in the EIT
broadcast prior to the first EIT section, wherein the first
EIT section is available prior to the second EIT section;
wherein determining it is likely the second EIT section will
be attainable prior to the first EIT section is based at least
in part on an amount of time required by the client device
to process the first EIT section.

14. The non-transitory computer readable medium of claim 13, wherein said monitoring includes detecting a currently broadcast EIT section, and wherein determining it is likely that the first EIT section will be available and attainable prior to the second EIT section comprises predicting the next available EIT section in the broadcast based on an EIT broadcast sequence.

15. The non-transitory computer readable medium of claim 14, wherein said predicting comprises accessing a sequence table which indicates said EIT broadcast sequence.

16. The non-transitory computer readable medium of claim 15, having further non-transitory computer-executable instructions for creating said sequence table by monitoring the EIT broadcast and learning said EIT broadcast sequence.

17. The non-transitory computer readable medium of claim 15, wherein said sequence is indicated by a private table received via broadcast.

18. The non-transitory computer readable medium of claim 13, having further non-transitory computer-executable instructions for:
searching an EIT section request queue to detect first and second concurrently pending requests for first and second EIT sections, respectively;
servicing the first request prior to the second request in response to determining it is likely that the first EIT section will be available and attainable in the EIT broadcast prior to the second EIT section, irrespective of an actual order of availability of the first EIT section and second EIT section.

19. The non-transitory computer readable medium of claim 18, having further non-transitory computer-executable instructions for selecting a request for servicing from said pending requests, wherein the selection is based in part on a current position in an EIT section broadcast, processing time to process an EIT section currently being received, and time required to set up a filter to receive another EIT section.

20. The non-transitory computer readable medium of claim 18, wherein the second EIT section is attainable prior to the first EIT section, and the first request is serviced before the second request.

21. The non-transitory computer readable medium of claim 13, having further non-transitory computer-executable instructions for:
monitoring EIT section version numbers in the broadcast;
detecting changes of EIT version numbers; and
automatically acquiring and updating an EIT section when its EIT section version number changes.

22. The non-transitory computer readable medium of claim 13, having further non-transitory computer-executable instructions for associating a receipt time stamp and byte count with received EIT sections to facilitate predicting when a next requested section will be available and attainable in the EIT broadcast.

23. The non-transitory computer readable medium of claim 22, wherein said predicting comprises determining an intersection spacing between requested EIT sections to predict a next available requested section based on client device response time, an EIT section broadcast sequence, said intersection spacing, and a queue of requested EIT sections.

24. The non-transitory computer readable medium of claim 13, having further non-transitory computer-executable instructions for:
defining an EIT schedule window;
determining if a broadcast EIT schedule event belongs in the EIT schedule window; and
acquiring the EIT section for the EIT schedule event if the EIT schedule event belongs in the EIT window.

25. A client device for acquiring event information table (EIT) information in an interactive television system, the device comprising:
a processor; and
memory;
wherein the processor is operable to:
monitor an EIT broadcast at a client device, said EIT broadcast comprising a plurality of EIT sections, wherein at least a portion of said EIT broadcast is cyclic;
initialize an EIT section table, wherein said initializing comprises incorporating section processing latencies of the client device in determining whether a requested section is to be acquired out of an order in which the requested section is broadcast;
detect a first request for a first section of said EIT sections and a second request for a second section of said EIT sections;
request acquisition of the second EIT section prior to the first EIT section responsive to determining it is likely that the second EIT section will be attainable in the EIT broadcast prior to the first EIT section, wherein the first EIT section is available prior to the second EIT section;
wherein determining it is likely the second EIT section will be attainable prior to the first EIT section is based at least in part on an amount of time required by the client device to process the first EIT section.

26. The client device of claim 25, wherein said the processor is further operable to detect a currently broadcast EIT section, and wherein determining it is likely that the first EIT section will be available and attainable prior to the second EIT section comprises predicting the next available EIT section in the broadcast based on an EIT broadcast sequence.

27. The client device of claim 26, wherein said predicting comprises accessing a sequence table stored in said memory which indicates said EIT broadcast sequence.

28. The client device of claim 27, wherein said the processor is operable to creating said sequence table by monitoring the EIT broadcast and learning said EIT broadcast sequence.

29. The client device of claim 27, wherein said sequence is indicated by a private table received via broadcast.

30. The client device of claim 25, wherein the processor is further operable to:
search an EIT section request queue and detect first and second concurrently pending requests for first and second EIT sections respectively in said queue;
service the first request prior to the second request in response to determining it is likely that the first EIT section will be available and attainable in the EIT broadcast prior to the second EIT section, irrespective of an actual order of availability of the first EIT section and second EIT section.

31. The client device of claim 30, wherein the processor is operable to select a request for servicing from said pending requests, wherein the selection is based in part on a current position in an EIT section broadcast, processing time to process an EIT section currently being received, and time required to set up a filter to receive another EIT section.

32. The client device of claim 30, wherein the second EIT section is attainable prior to the first EIT section, and the first request is serviced before the second request.

33. The client device of claim 25, wherein the processor is further operable to:
monitor EIT section version numbers in the broadcast;
detect changes of EIT version numbers; and
automatically acquire and update an EIT section when its EIT section version number changes.

34. The client device of claim 25, wherein the processor is further operable to associate a receipt time stamp and byte count with received EIT sections to facilitate predicting when a next requested section will be available and attainable in the EIT broadcast.

35. The client device of claim 34, wherein said predicting comprises determining an inter-section spacing between requested EIT sections to predict a next available requested section based on client device response time, an EIT section broadcast sequence, said inter-section spacing, and a queue of requested EIT sections.

36. The client device of claim 25, wherein the processor is further operable to:
define an EIT schedule window;
determine if a broadcast EIT schedule event belongs in the EIT schedule window; and
acquire the EIT section for the EIT schedule event if the EIT schedule event belongs in the EIT window.

37. The client device of claim 25, wherein the device is coupled to receive said EIT broadcast from a head end.

* * * * *